United States Patent [19]
Kim et al.

[11] Patent Number: 5,206,852
[45] Date of Patent: Apr. 27, 1993

[54] HIGH-DENSITY RECORDING OPTICAL HEAD

[75] Inventors: Yeong-woong Kim, Seoul; Ick-hyoung Yoo, Kyunggi-do; Chul-woo Lee; Byeong-ho Park, both of Seoul; Chang-geun Kim, Seongnam, all of Rep. of Korea

[73] Assignee: Samsung Electronics Co., Ltd., Kyunggi-do, Rep. of Korea

[21] Appl. No.: 814,629

[22] Filed: Dec. 30, 1991

[30] Foreign Application Priority Data

Jun. 29, 1991 [KR] Rep. of Korea ............... 91-11046

[51] Int. Cl.⁵ ............................................. G11B 7/18
[52] U.S. Cl. ................................. 369/112; 369/118
[58] Field of Search .......... 369/112, 111, 109, 44.24, 369/44.23, 121, 122, 116, 100, 118

[56] References Cited

U.S. PATENT DOCUMENTS

| | | | |
|---|---|---|---|
| 4,110,607 | 8/1978 | Honjo et al. | 369/121 |
| 4,811,328 | 3/1989 | Ito et al. | 369/112 |
| 5,025,438 | 6/1991 | Emoto | 369/112 |
| 5,072,437 | 12/1991 | Chikuma | 369/118 |
| 5,105,410 | 4/1992 | Maeda et al. | 369/112 |
| 5,155,718 | 10/1992 | Hashimoto et al. | 369/118 |

Primary Examiner—Carolyn E. Fields
Assistant Examiner—Drew A. Dunn
Attorney, Agent, or Firm—Leydig, Voit & Mayer

[57] ABSTRACT

A high-density recording optical head for increasing recording density in an optical head for recording and reproducing information optically. The disclosed optical head is provided with an iris for transmitting or passing the central portion of the reflected light when the light reflected from a medium is transmitted by an ordinary objective lens. Another iris is also provided for transmitting or reflecting the periphery of the reflected light and, in this case, an improved objective lens structure including two inner and outer elements is provided. Therefore, in the disclosed optical head, only light reflected from the actual recording region is detected as a reproduction signal. According to the disclosed optical head, high-density recording in identical media becomes possible.

11 Claims, 9 Drawing Sheets

HIGH-DENSITY RECORDING OPTICAL HEAD

BACKGROUND OF THE INVENTION

This invention relates to an optical head for recording desired information on a medium such as a magneto-optical disk and for reproducing recorded information, and more particularly to a high-density recording optical head for detecting only light reflected from regions of the medium where information is actually recorded, in order to increase the recording density of the medium.

In processing information optically, in order to process large amounts of information in a short period of time, it is necessary to record as much information as possible on one piece of medium. Accordingly, for recently popular magneto-optical disks, for example, an iristor method in which a reproducing layer is added to a recording layer has been suggested. Nevertheless, in such a method, high production costs due to disk structure and the necessity for complicated operational pick-up structures raise difficulties in actual applications.

Another method for increasing recording density requires minimization of the unit of information, and accordingly, minimization of the diameter of a light spot formed on a disk. However, if laser light is concentrated by a convergent lens, only a narrow beam may be formed at the focus point, but it does not diminish infinitely. Therefore, there is a limit to the possible improvement of recording density according to these methods.

Figure 1:
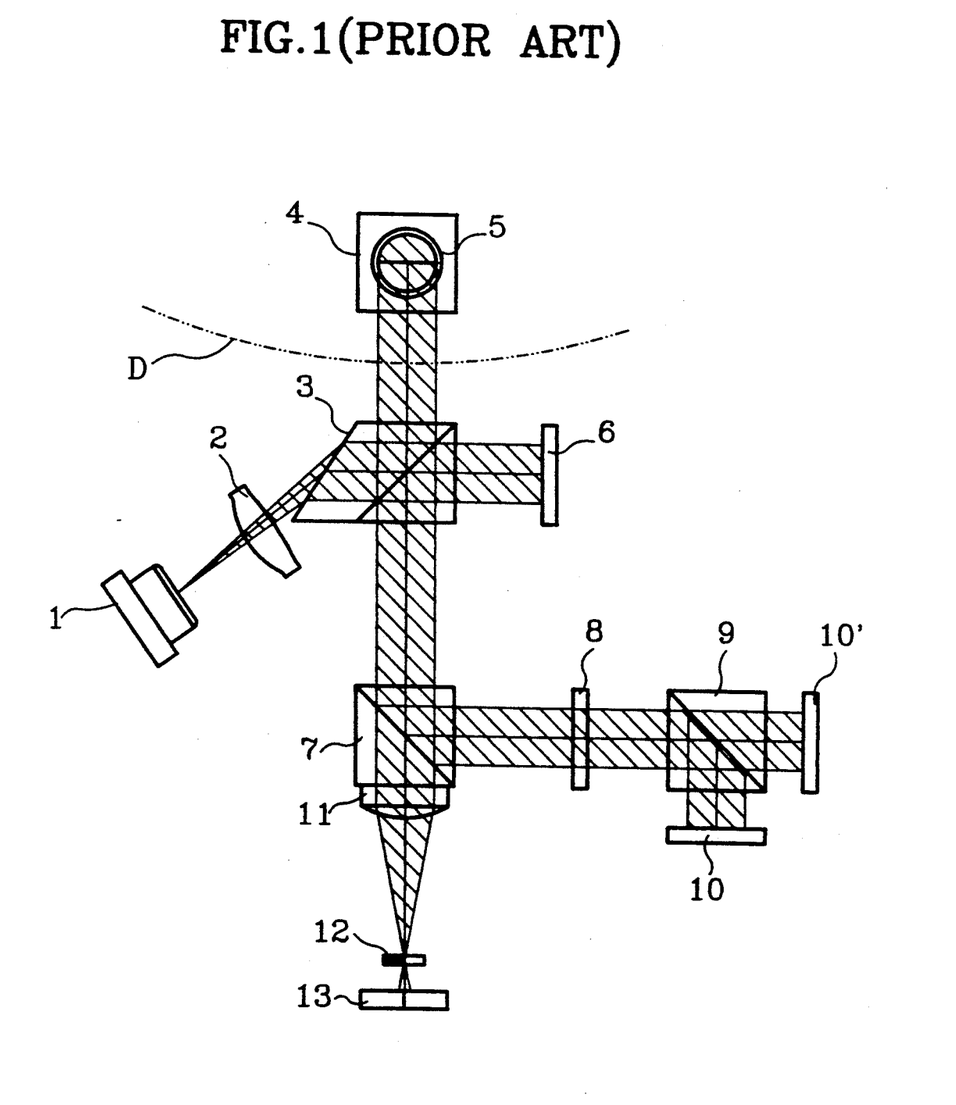
FIG. 1 is a layout of a conventional optical head.

A more detailed description of the above with reference to FIG. 1 is as follows.

In a conventional optical head, during recording, light incident on the disk D is emitted from laser diode 1 and is collimated by collimating lens 2, is given a circular cross section by passing through beam shaping prism 3, and is concentrated onto disk D by objective lens 5. Light reflected from disk D is divided into two beams by beam splitter 7. One of these beams reaches photodiodes 10 and 10' for detecting a reproduction signal, and the other beam reaches photodiode 13 for detecting a control signal. In the figure, a reference numeral 4 is a reflecting mirror, 6 is a monitor photodiode, 8 is a half-wavelength plate, 9 is a polarization beam splitter, 11 is a condensing lens and 12 is a double edge.

According to this drawing, the magnitudes of the light spot formed on disk D during recording and the light beam detected by photodiodes 10 and 10' during reproduction are determined by objective lens 5, that is, a convergent lens. However, as mentioned above, the diameter of a light spot concentrated by objective lens 5 does not diminish infinitely, and the diameter D is given by $$D = C \cdot \lambda / (NA)$$

where,

C is a proportionality coefficient, $\lambda$ is the wavelength of the light of the spot, and NA is the numerical aperture of the objective lens.

Thus, if C=0.7, $\lambda$=830 nm, NA=0.5, a light spot has D=1.2 $\mu$m. Moreover, since the diametrical light intensity of such a light spot has a gaussian distribution. In this distribution, only light with strengths above a certain curie temperature around the photo axis may be recorded as a signal on the magneto-optical disk.

Figure 12A:
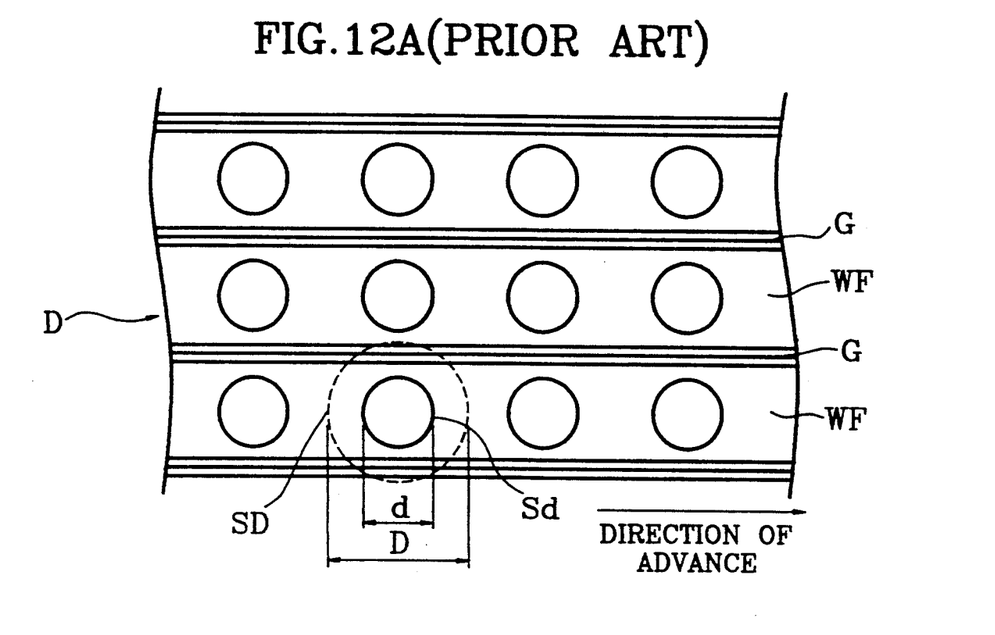
FIG. 12A is a recording pattern showing light spots formed on a disk.
Figure 12B:
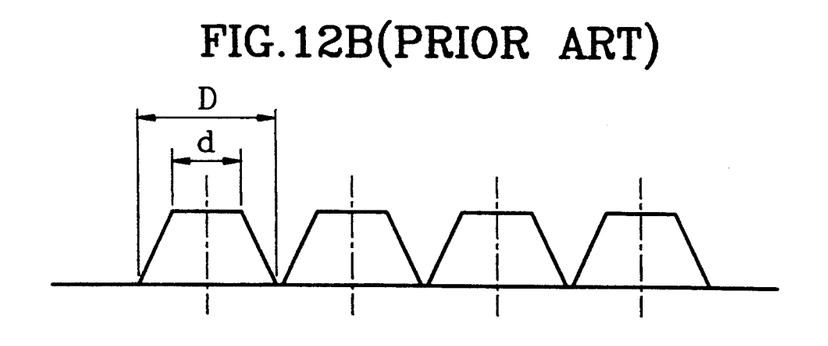
FIG. 12B is a diagram showing a signal waveform detected by a conventional optical head.

Therefore, as shown in FIG. 12A, the diameter d of the recording region Sd of a signal recorded on a recording face WF between grooves G of a disk is only about 0.5 to 0.6 times the diameter D of the light spot region SD formed on the recording face WF. If the only light reflected from the recording region Sd of diameter d can be detected, a desired reproduction signal may be obtained without interference with light reflected from the light spot region SD with diameter D excluding the recording region Sd with diameter d, and in this case, the interval between recording regions Sd on recording face WF during recording may be narrowed, allowing the increase of recording density.

However, in a conventional optical head, the diameter of a light beam detected by a detection device is determined by the capability of the objective lens 5 to concentrate the light beam, and the reflected light from the entire light spot region SD with diameter D is picked up by the objective lens 5. Accordingly, the interval between recording regions Sd could not be reduced to be less than D.

Meanwhile, according to Japanese Patent publication No. Sho 61-1050122, use of a wavelength transformer halving the wavelength of light emitted from a semiconductor laser in order to increase information recording density has been disclosed. Nevertheless, light efficiency is reduced by about 90% during operation of the wavelength transformer, preventing practical application.

SUMMARY OF THE INVENTION

It is an object of this invention to provide a high-density recording optical head for detecting only light reflected from the actual recording region of a medium, so as to reduce the distance between the actual recording regions.

The above-stated object of this invention may be accomplished by providing means for picking up light reflected from the disk during reproduction by an objective lens, and for enabling only the central portion of the picked up light to reach a detection device.

To accomplish the above-stated object of this invention, there is provided a high-density recording optical head comprising a light source, an objective lens for focusing light incident on a medium and light reflected from the medium, a photodetector for detecting the reflected light and an iris for transmitting the central portion of the reflected light directed from the objective lens to the photodetector, whereby only light reflected from a recording region of the medium is detected as a reproducing signal.

In addition, the above-stated object of this invention may be accomplished by improving the structure of an objective lens for focusing and picking up light with respect to a medium so as to concentrate the periphery of incident light within the actual recording region and to increase the degree of focusing, and by providing means for detecting the periphery of reflected light picked up by the improved objective lens.

Accordingly, there is provided a high-density recording optical head according to this invention comprising a light source, an objective lens for focusing light incident on and reflected from a medium, a photodetector for detecting light reflected from the medium, the objective lens including an inner element for focusing the central portion of the incident light and an outer element, concentric with the inner element, for focusing the remaining periphery within the concentration region of the inner element, and an iris for transmitting or reflecting the periphery the reflected light directed from the objective lens structure to the photodetector, whereby the degree of focusing of light incident on the recording region of the medium is increased and only light reflected from the recording region as a reproduction signal is detected.

According to a first aspect of this invention as stated above, only light reflected from the actual recording region within the area of the light spot focused on a medium (disk) through the objective lens of a conventional optical head is detected as a reproduction signal. Therefore, there is no degradation in reproduction due to interference of light reflected from regions other than the recording region, whereby the interval between recording regions may be narrowed by overlapping a portion of the region of the light spot excluding the recording region with an adjacent light spot region, enabling high-density recording.

According to a second aspect of this invention, an objective lens structure having inner and outer elements is used, where the inner element for focusing the central portion of incident light may be implemented by an ordinary convergent lens with a small diameter, for example, a convex lens or an aspherical single-lens, and the outer element for focusing the periphery of incident light within the focusing region of the inner element may be implemented, for example, by an annular lens with a large refraction index or an annular parabolic mirror. According to such an objective lens structure, during recording, the degree of focusing of light focused on the actual recording region is high, and recording density may be further increased by detecting light reflected from the recording region as a reproduction signal during reproduction.

DETAILED DESCRIPTION OF THE INVENTION

A detailed description of a preferred embodiment of this invention follows with reference to the accompanying drawings.

Figure 2:
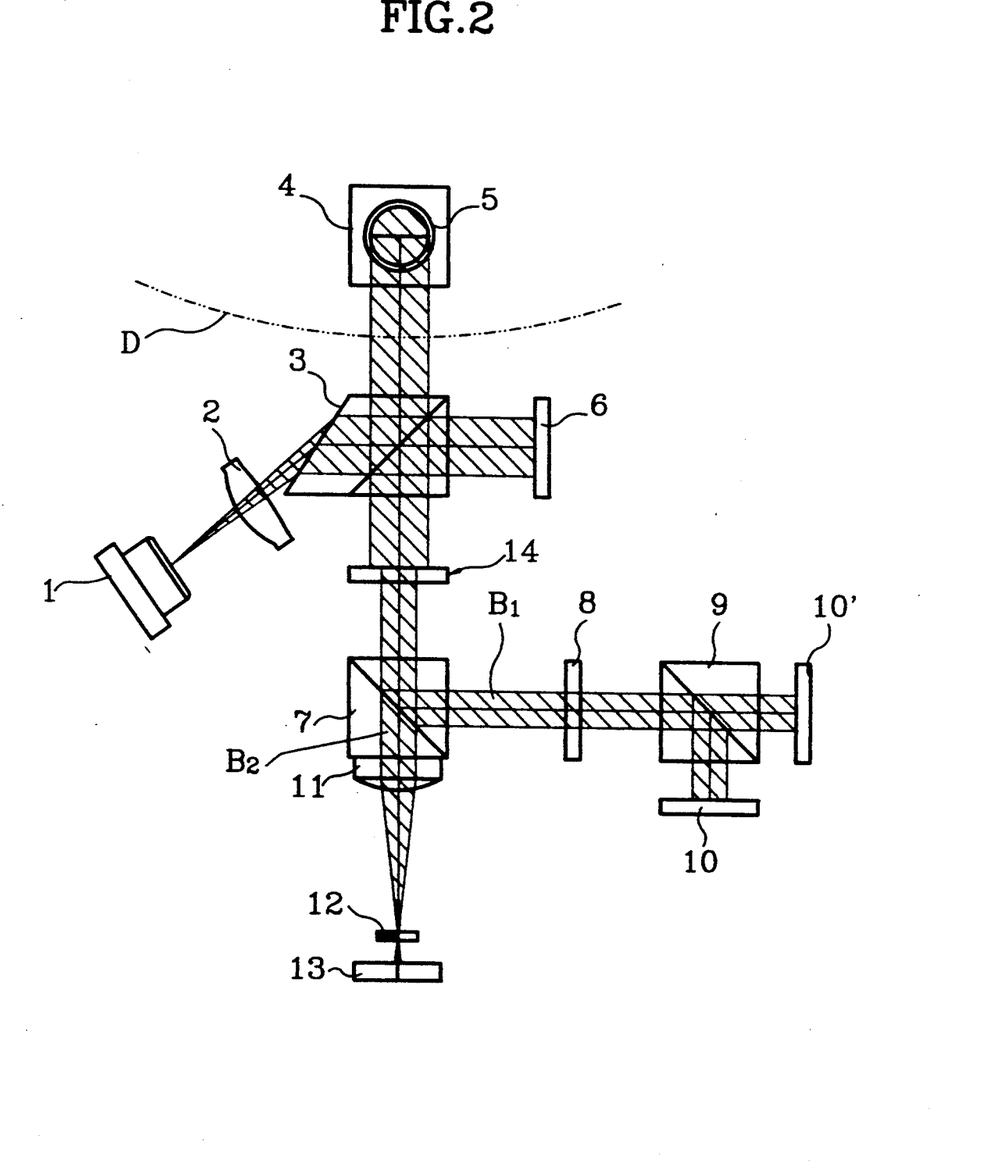
FIG. 2 is a layout of an optical head adopting an iris according to a first embodiment of this invention.

FIG. 2 is a diagram showing one embodiment of this invention where the optical elements are placed along the axis of the objective lens. In this embodiment, an ordinary objective lens 5 is used as an objective lens for focusing the incident light and picking up the reflected light with respect to disk D, and iris 14 is added in the path of the reflected light to transmit the central portion of the reflected light. A detailed description of iris 14 will be given later.

In FIG. 2, light source 1 emits modulated light during recording and unmodulated light during reproduction. Collimating lens 2 collimates light emitted from light source 1. Beam shaping prism 3 shapes the parallel light so that the light beam incident on objective lens 5 has a circular cross section. Here, the intensity of the incident light beam is monitored by monitor photodetector 6. The incident light beam is incident along the central axis of objective lens 5 perpendicular to disk D from reflecting mirror 4 and then is focused on disk D by objective lens 5. Thereafter, the incident light beam is reflected from disk D, and then focused by objective lens 5.

The reflected light beam is transmitted through beam shaping prism 3 and is directed to a path different from that of the incident light beam.

This reflected light beam is limited by iris 14 into a beam having a specified diameter. This beam is divided into two beams $B_1$ and $B_2$ by passing through beam splitter 7 as usual, beam $B_1$ passing through half-wavelength plate 8 and polarization beam splitter 9 and reaching photodetectors 10 and 10' for detecting two reproduction signals. The other beam $B_2$ passes through condensing lens 11 and double edge 12 and reaches quartering photodetector 13 for detecting control signals.

Here, as shown in FIG. 12A, recording face WF of disk D is partitioned into regular intervals by grooves G, and recording regions Sd of diameter d are formed at regular intervals on the recording face WF. However, a light spot from objective lens 5 is concentrated on a larger light spot area of diameter D. Therefore, the reflected light passing through ordinary objective lens 5 may be classified into a central portion reflected from recording region Sd and a periphery reflected from light spot region SD excluding recording region Sd.

Figure 4A:
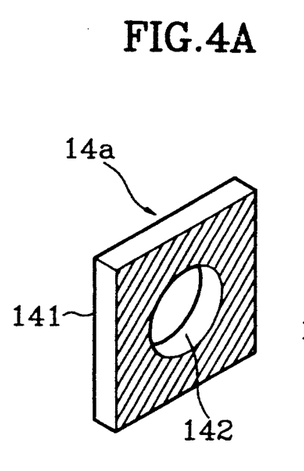
FIGS. 4A, 4B and 4C are perspective views showing various constitutions of the irises adopted in FIGS. 2 and 3.
Figure 4B:
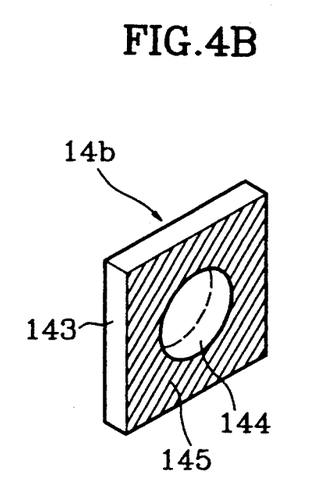
Figure 12C:
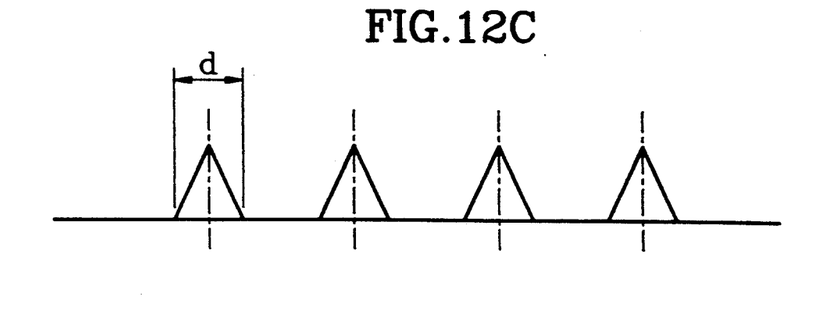
FIG. 12C is a diagram showing a signal waveform detected by an optical head according to this invention.

Iris 14 transmits the central portion of such reflected light and absorbs or reflects the periphery. Therefore as shown in FIG. 12C, a reproduction signal of width d is output at photodetectors 10 and 10' for detecting reproduction signals. Iris 14 is an iris 14a formed as an absorbing or reflecting plate 141 with a hole 142 in the middle or by an iris 14b formed as a transparent plate 143 coated with an absorbing or reflecting film in the portions excluding a transparent region 144 of a specified diameter as shown in FIGS. 4A and 4B.

Figure 3:
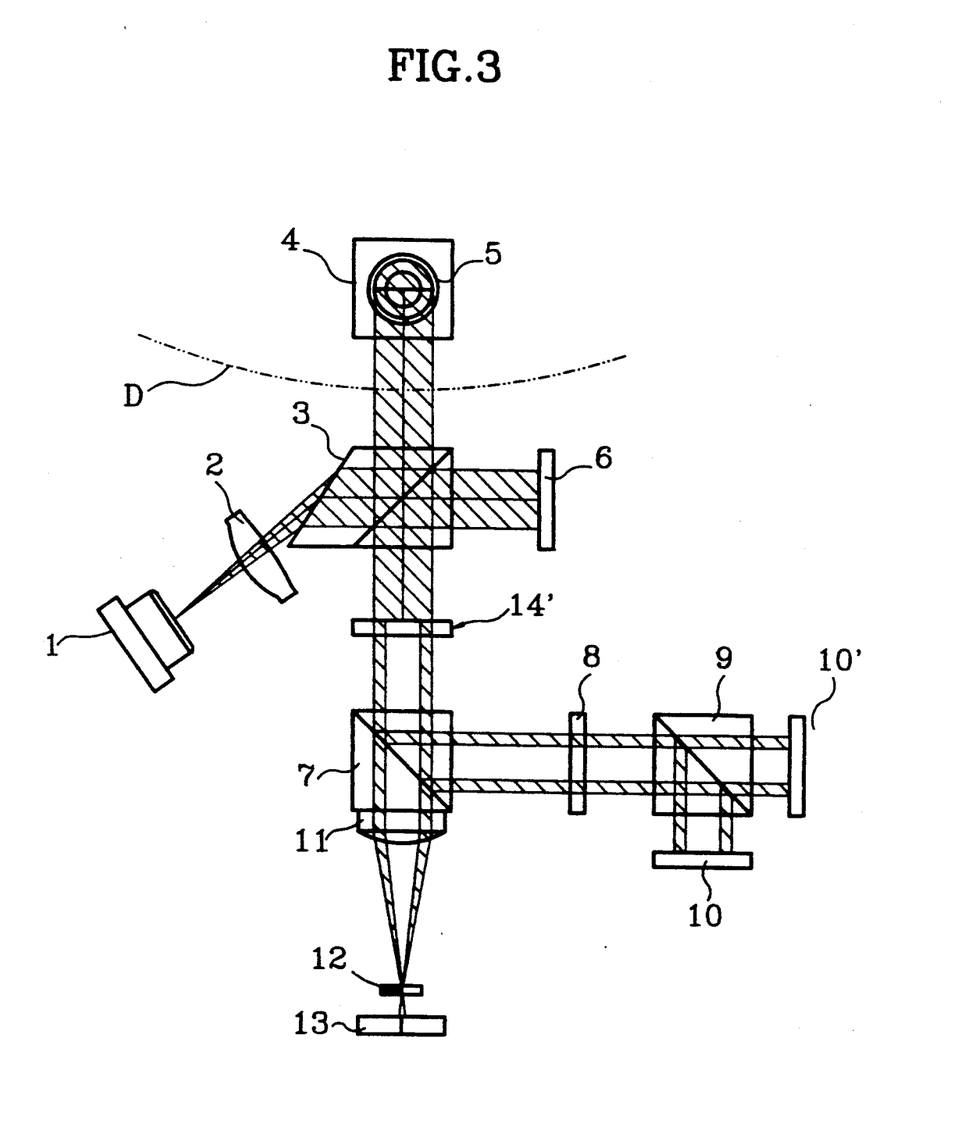
FIG. 3 is a layout of an optical head adopting an improved objective lens structure and a different iris according to a second embodiment of this invention.

FIG. 3 is a diagram of another embodiment of this invention. In this embodiment, an improved objective lens structure 5' and an iris 14' for transmitting the periphery of reflected light beam are included.

Figure 4C:
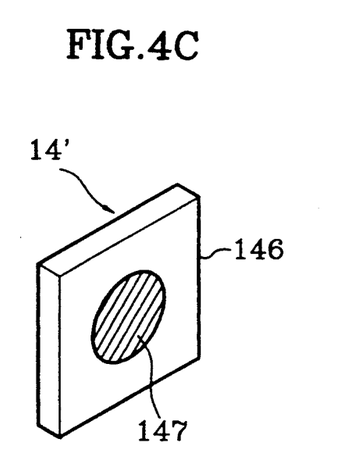

As shown in FIG. 4C, iris 14' is implemented by a transparent plate 146 formed with an absorbing or reflecting film 147 in the middle. Also, as shown in FIGS.

Figure 5A:
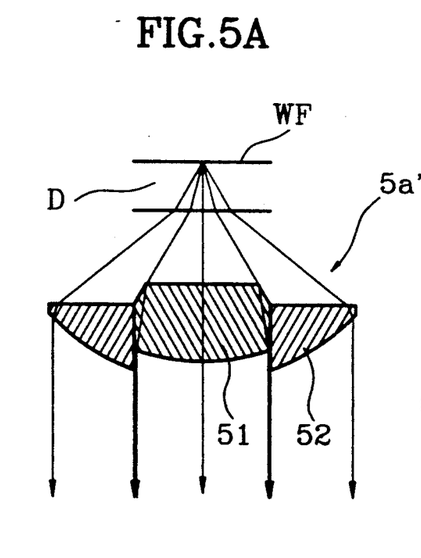
FIGS. 5A and 5B are cross-sectional views showing the constitution of the objective lenses shown in FIG. 3.
Figure 5B:
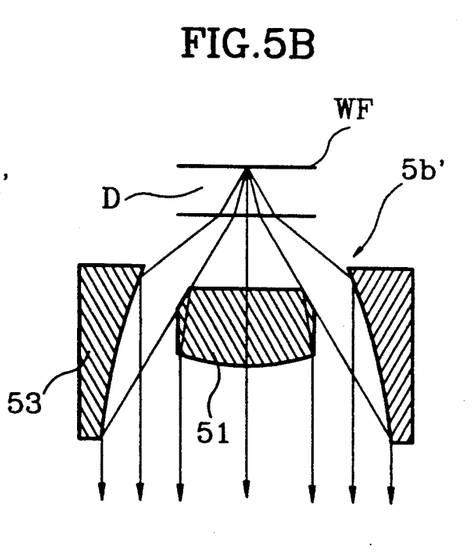

5A and 5B, for objective lens structure 5', the inner element is a convex lens 51 as an ordinary convergent lens having a small diameter, and the outer element is an annular lens 52 with a large refraction index, or by an annular parabolic mirror 53, thereby forming objective lens structures 5a' and 5b', respectively.

Figure 6:
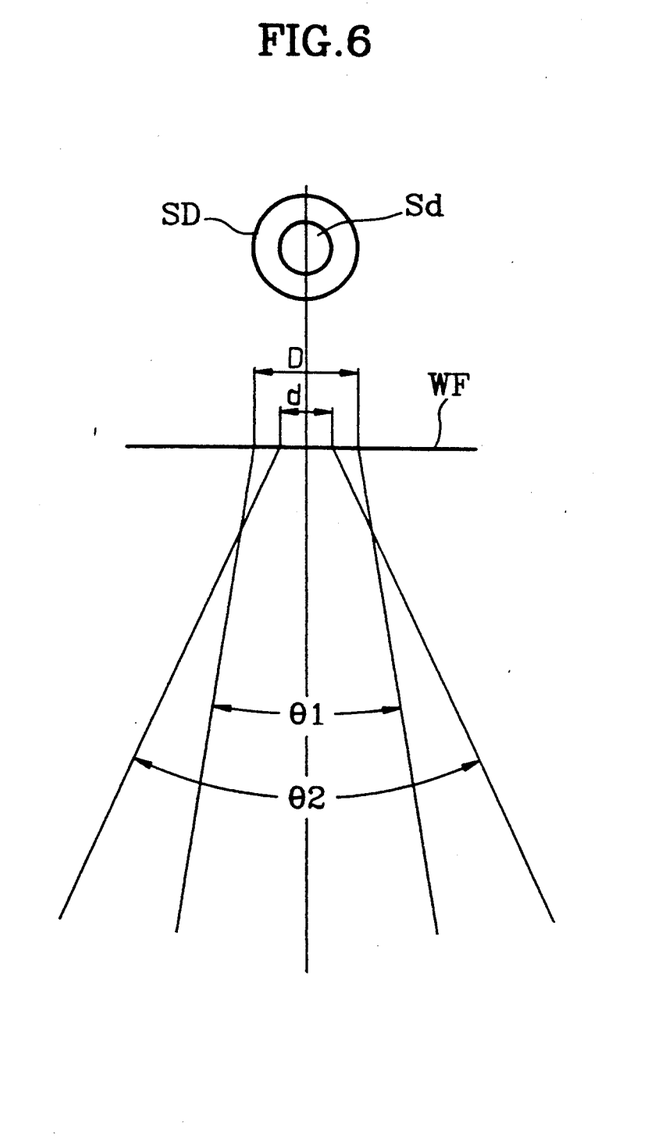
FIG. 6 is an enlarged diagram schematically showing a light spot formed on a disk and the reflected light from it according to the embodiment shown in FIG. 3.

In objective lens structures, 5, 5a' and 5b', the inner element, that is, convex lens 51, concentrates the central portion of an incident light beam on the light spot region SD of the recording face WF, while annular lens 52 or annular parabolic mirror 53, which is the outer element, concentrates the periphery of the incident light beam on the recording region Sd within the above light spot region SD, thereby focusing the incident light beam and reflected light. FIG. 6 shows the incidence and reflectance of light on and from the recording face WF according to objective lens structures 5', 5a' and 5b'. Here, $\theta 1$ is the optic angle of the central portion of incident (or reflected) light, and $\theta 2$ shows the optic angle of the periphery.

According to such an embodiment, the degree of focusing of the light (periphery) incident on the actual recording region Sd is increased, and by allowing only the highly concentrated light to selectively pass through iris 14', an object of this invention may be accomplished. Accordingly, recording of a higher density than in the first embodiment mentioned above may be carried out.

In the embodiments of this invention, iris 14, 14a, 14b or 14' is placed in the optical path before photodetectors 10 and 10' for detecting reproduction signals. Many variations are possible for each embodiment. Some of these variations are shown in FIGS. 7 through 11.

Figure 7:
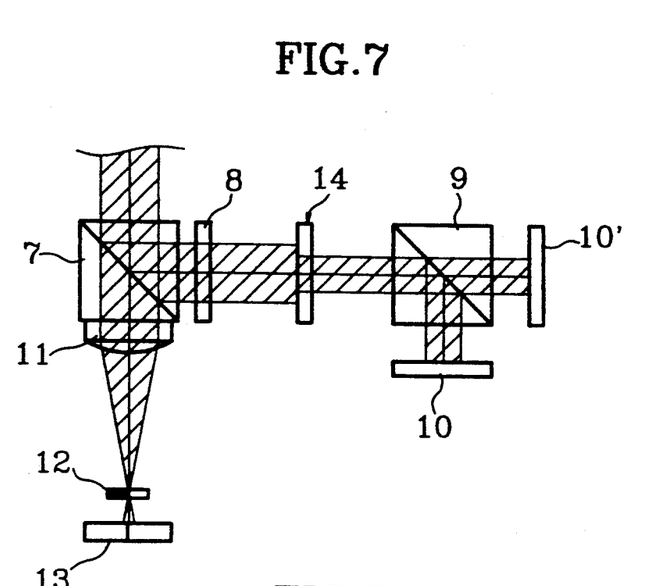
FIG. 7 through FIG. 10 are layouts showing examples of variation in position of irises shown in FIGS. 2 and 3.
Figure 8:
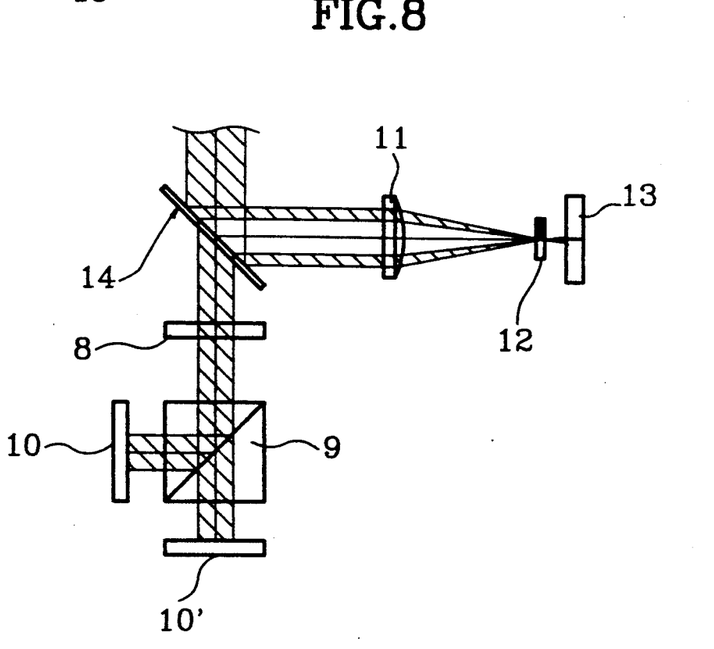

FIGS. 7 and 8 are variations based on the layout shown in FIG. 2, where iris 14 is placed between beam splitter 7 and polarized beam splitter 9, or at a location of beam splitter 7. Iris 14 of FIG. 8 must be of the type shown in FIGS. 4A and 4B where light is reflected from the portions excluding the hole 142 or the transparent portion 144. In FIG. 8, light intensity at each photodetector is not weakened as in the case of a beam splitter (or half-mirror) and there is the advantage a reduction in number of parts used.

Figure 9:
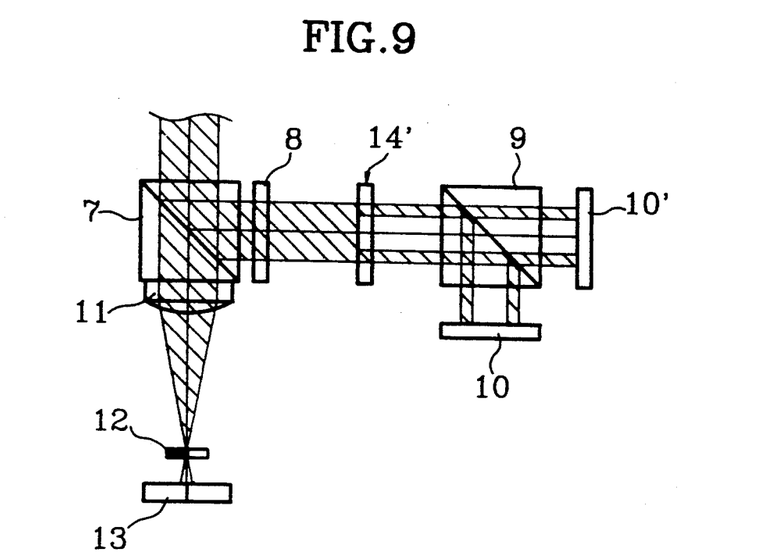
Figure 10:
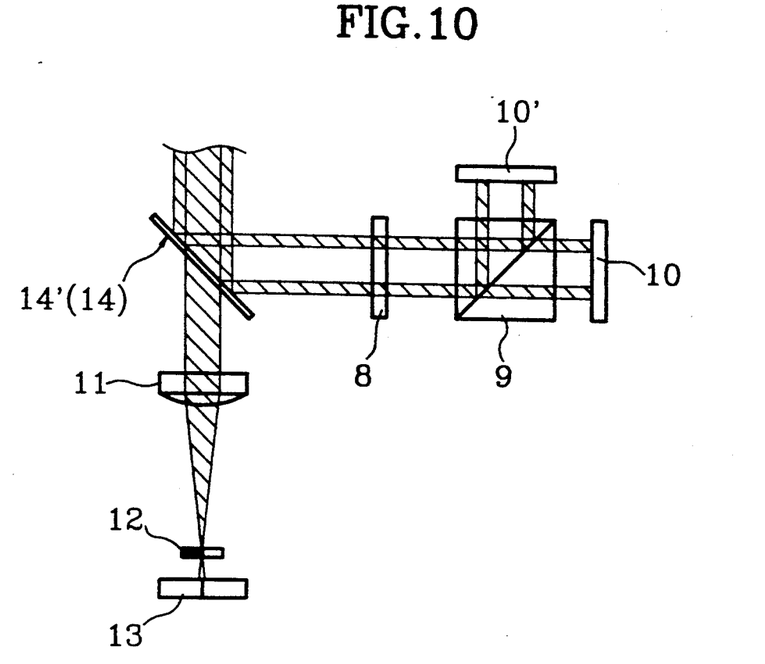

FIGS. 9 and 10 are variations based on the layout of FIG. 3, where iris 14' is placed at the same respective positions as in FIGS. 7 and 8. In the variation shown in FIG. 10, iris 14, 14a, or 14b of FIGS. 4A or 4B must be used, where the periphery is implemented by a reflecting plate.

Figure 11A:
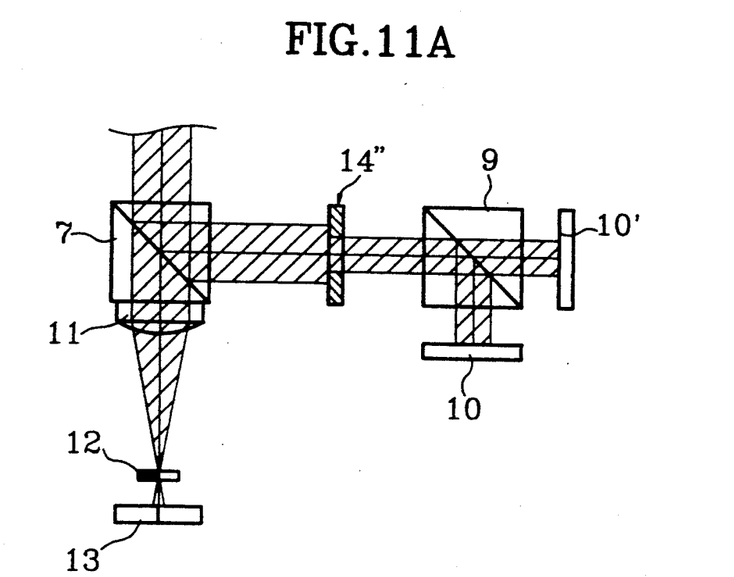
FIGS. 11A and 11B are layouts showing the cases where the irises of FIGS. 7 and 9 also function as a half-wavelength plate.
Figure 11B:
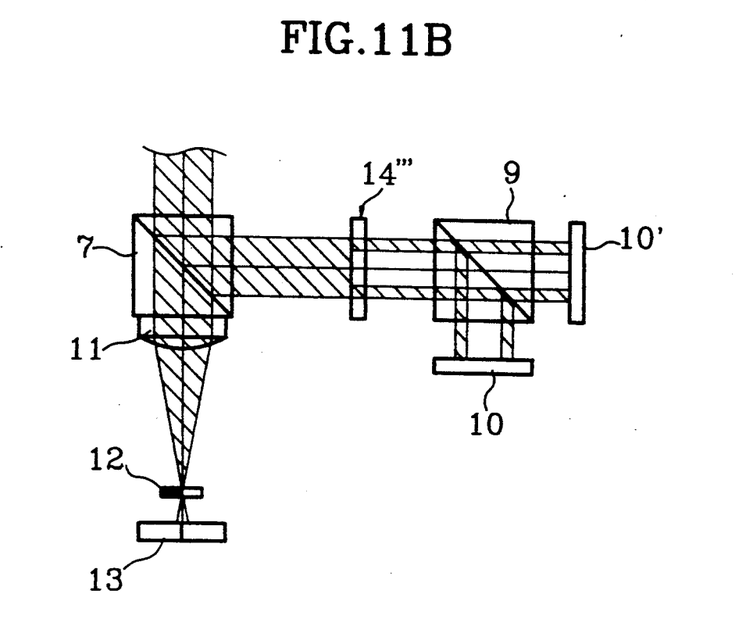

FIGS. 11A and 11B are alternative variations based on the layouts of FIGS. 7 and 9 mentioned above, where irises 14" and 14''' are constituted and placed to play, in addition, the roles of half-wavelength plates.

As described above, this invention is provided with an optical head comprising an ordinary objective lens and an iris for selectively transmitting or passing only the central portion of reflected light beam, or with an improved objective lens structure and another iris for selectively transmitting only the periphery of the reflected light beam, thereby enabling high-density recording of the desired information. In effect, the interval between grooves of the existing magneto-optical disk may be reduced by one-third. Accordingly, a ninefold recording density improvement and a three-fold information transfer rate, are obtained.

In addition, by only requiring the addition of an iris or selectively replacing the objective lens in a conventional optical system to realize high-density recording, this invention is very economical. Especially, according to the second embodiment of this invention, the efficiency of light used is maximized, leading to low power consumption.

The extent of this invention is not limited to the above descriptions and figures presented, and variations and modifications within the scope of the claims that follow are possible.

What is claimed is:

1. A high-density recording optical head for recording and reproducing information optically on and from a medium comprising a light source, an objective lens for focusing incident light on a medium and light reflected from the medium, a photodetector for detecting the reflected light, and an iris for passing a central portion of the reflected light from said objective lens to said photodetector, whereby only light reflected from a recording region of said medium is detected as a reproduction signal.

2. The high-density recording optical head as claimed in claim 1 wherein said iris includes a light absorbing or reflecting body having a hole for passing a central portion of the reflected light.

3. The high-density recording optical head as claimed in claim 1 wherein said iris includes a transparent plate having a light absorbing or reflecting portion for absorbing or reflecting a peripheral portion of the reflected light.

4. The high-density recording optical head as claimed in claim 1 wherein said iris is oriented so that a central portion and a periphery of the reflected light are directed along different paths at said iris.

5. The high-density recording optical head as claimed in claim 1 wherein said iris is a polarizing iris so that the reflected light transmitted through said iris is polarized by said iris.

6. A high-density recording optical head for recording and reproducing information optically on and from a medium comprising a light source, an objective lens for focusing incident light on a medium and light reflected from the medium, a photodetector for detecting the reflected light, said objective lens including an inner element for focusing a central portion of the incident light and an outer element for focusing a peripheral portion within the light focused by said inner element, said inner and outer elements being concentric, and an iris for transmitting a peripheral portion of the reflected light directed from said objective lens to said photodetector, whereby the degree of focusing of the light incident on a recording region of the medium is increased and only light reflected from the recording region as a reproduction signal is detected.

7. The high-density recording optical head as claimed in claim 6 wherein said iris includes a transparent plate on which an absorbing or reflecting film is disposed for absorbing or reflecting a central portion of the reflected light.

8. The high-density recording optical head as claimed in claim 6 wherein said iris is disposed obliquely to the reflected light to separate a central portion and a peripheral portion of the reflected light into separate light beams.

9. The high-density recording optical head as claimed in claim 6 wherein said iris is a polarizing iris so that the reflected light transmitted through said iris is polarized by said iris.

10. The high-density optical head as claimed in claim 6 wherein said outer element of said objective lens comprises one of an annular lens and an annular parabolic mirror.

11. A high-density recording optical head for optically recording information on and reproducing information from a medium comprising a light source, an objective lens for focusing incident light on a medium and light reflected from the medium, a photodetector for detecting the reflected light, said objective lens including an inner element for focusing a central portion of the incident light and an outer element for focusing a peripheral portion within the light focused by said inner element, said inner and outer elements being concentric, and an iris for reflecting a peripheral portion of the reflected light directed from said objective lens to said photodetector, whereby the degree of focusing of the light incident on a recording region of the medium is increased and only light reflected from the recording region as a reproduction signal is detected.

* * * * *